(12) United States Patent
Luft

(10) Patent No.: US 9,329,268 B2
(45) Date of Patent: May 3, 2016

(54) PARKING SENSOR/OBSERVATION SYSTEM ADD-ON FOR A VEHICLE

(75) Inventor: Christopher A. Luft, Deltona, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 336 days.

(21) Appl. No.: 12/612,971

(22) Filed: Nov. 5, 2009

(65) Prior Publication Data

US 2010/0117862 A1    May 13, 2010

Related U.S. Application Data

(60) Provisional application No. 61/112,313, filed on Nov. 7, 2008.

(51) Int. Cl.

| | |
|---|---|
| *B60Q 1/48* | (2006.01) |
| *G01S 15/93* | (2006.01) |
| *B60R 11/04* | (2006.01) |
| *G01S 7/521* | (2006.01) |
| *G01S 15/02* | (2006.01) |
| *B60R 13/10* | (2006.01) |
| *B60R 11/00* | (2006.01) |

(52) U.S. Cl.
CPC .............. *G01S 15/931* (2013.01); *B60R 11/04* (2013.01); *G01S 7/521* (2013.01); *G01S 15/025* (2013.01); *B60R 13/10* (2013.01); *B60R 2011/004* (2013.01); *B60R 2011/0052* (2013.01); *B60R 2011/0075* (2013.01)

(58) Field of Classification Search
CPC ....... B60R 11/04; G01S 7/521; G01S 15/025; G01S 15/931
USPC ................ 340/932.2, 435, 438, 439; 348/148
See application file for complete search history.

(56) References Cited

U.S. PATENT DOCUMENTS

| | | | | |
|---|---|---|---|---|
| 6,273,378 | B1 * | 8/2001 | Fu ........................ | B60Q 1/0483 248/187.1 |
| 6,433,680 | B1 * | 8/2002 | Ho .......................... | B60Q 1/22 180/169 |
| 6,720,868 | B2 * | 4/2004 | Flick ............................. | 340/435 |
| 7,005,974 | B2 * | 2/2006 | McMahon ............. | B60Q 9/005 248/200 |
| 7,511,607 | B2 * | 3/2009 | Hubbard et al. .............. | 340/435 |
| 7,868,747 | B2 * | 1/2011 | Tang et al. .................... | 340/435 |

(Continued)

OTHER PUBLICATIONS

International Search Report dated Mar. 19, 2009 in PCT/US08/88142.

*Primary Examiner* — Tai T Nguyen
(74) *Attorney, Agent, or Firm* — F. Chau & Associates, LLC

(57) ABSTRACT

A parking sensor and observation system for a vehicle, including: an elongated housing, wherein the housing has a front side with first to third openings and a back side with an elongated opening, the first and third openings are adjacent to opposite ends of the housing, the second opening is located at a center portion of the housing; a first parking sensor disposed within the housing and having its proximity detector disposed in the first opening; a second parking sensor disposed within the housing and having its proximity detector disposed in the third opening; a camera disposed within the housing and having its lens disposed in the second opening; and a backing plate disposed at the back side of the housing to seal the elongated opening.

12 Claims, 6 Drawing Sheets

(56) References Cited

U.S. PATENT DOCUMENTS

| | | | |
|---|---|---|---|
| 7,883,064 B2* | 2/2011 | Luft et al. | 248/200 |
| 2002/0003571 A1* | 1/2002 | Schofield et al. | 348/148 |
| 2006/0044160 A1* | 3/2006 | Hong | 340/932.2 |
| 2006/0257136 A1* | 11/2006 | Son | B60R 11/04 396/419 |
| 2007/0080585 A1 | 4/2007 | Lyu | |
| 2007/0171032 A1* | 7/2007 | Dayan | B60R 11/0235 340/435 |
| 2007/0236364 A1* | 10/2007 | Hubbard et al. | 340/932.2 |
| 2009/0079828 A1* | 3/2009 | Lee et al. | 348/148 |
| 2009/0128687 A1* | 5/2009 | Woo | B60R 11/04 348/373 |
| 2009/0153663 A1* | 6/2009 | Ramos | B60R 1/00 348/148 |
| 2009/0166488 A1 | 7/2009 | Luft et al. | |

* cited by examiner

PARKING SENSOR/OBSERVATION SYSTEM ADD-ON FOR A VEHICLE

CROSS-REFERENCE TO RELATED APPLICATION

This application claims priority under 35 U.S.C. §119(e) to U.S. Patent Application No. 61/112,313, filed Nov. 7, 2008, the disclosure of which is incorporated by reference herein in its entirety.

BACKGROUND OF THE INVENTION

1. Technical Field

The present invention relates to vehicle parking sensors and vehicle backup cameras, and more particularly, to aftermarket devices therefor.

2. Discussion of the Related Art

Parking sensors are a technology that allows the driver of a vehicle to be alerted to nearby objects in their path. Parking sensors are also known as backup sensors, parking sonar or just sonar depending on the automaker. While there are variations in the design and features of these systems, the basic design puts sensors in the vehicle's bumper. These sensors send ultrasonic waves at 40,000 times per second to detect obstacles behind the vehicle. A controller installed inside the vehicle receives the signal from the sensors and transmits it to a speaker that emits a tone, or to a combination speaker and display unit.

A backup camera system, such as those found in many SUVs, minivans and luxury vehicles shows a driver what is behind them as they are reversing and displays it on the vehicle dashboard LCD so that the driver can avoid accidents. Such a system generally includes a camera mounted onto the rear of a vehicle, a display device mounted in the interior of the vehicle and the necessary wiring.

For vehicles that do not have built-in parking sensors or a backup camera system, aftermarket systems are available. Some aftermarket systems are mountable on a vehicle's license plate. License plate mounting of an aftermarket system can obstruct parts of the license plate that must be legally visible. Examples of license plate parts with legal visibility requirements include a registration sticker, State or County name. Further, in aftermarket systems that are only license plate mountable, the parking sensors may not be positionable for optimal detection of objects behind the vehicle.

Accordingly, there is a need for an aftermarket system with backup camera and/or parking sensor capabilities that does not obstruct license plate parts with legal visibility requirements and that can be positionable for optimal object detection.

SUMMARY OF THE INVENTION

Figure 1:
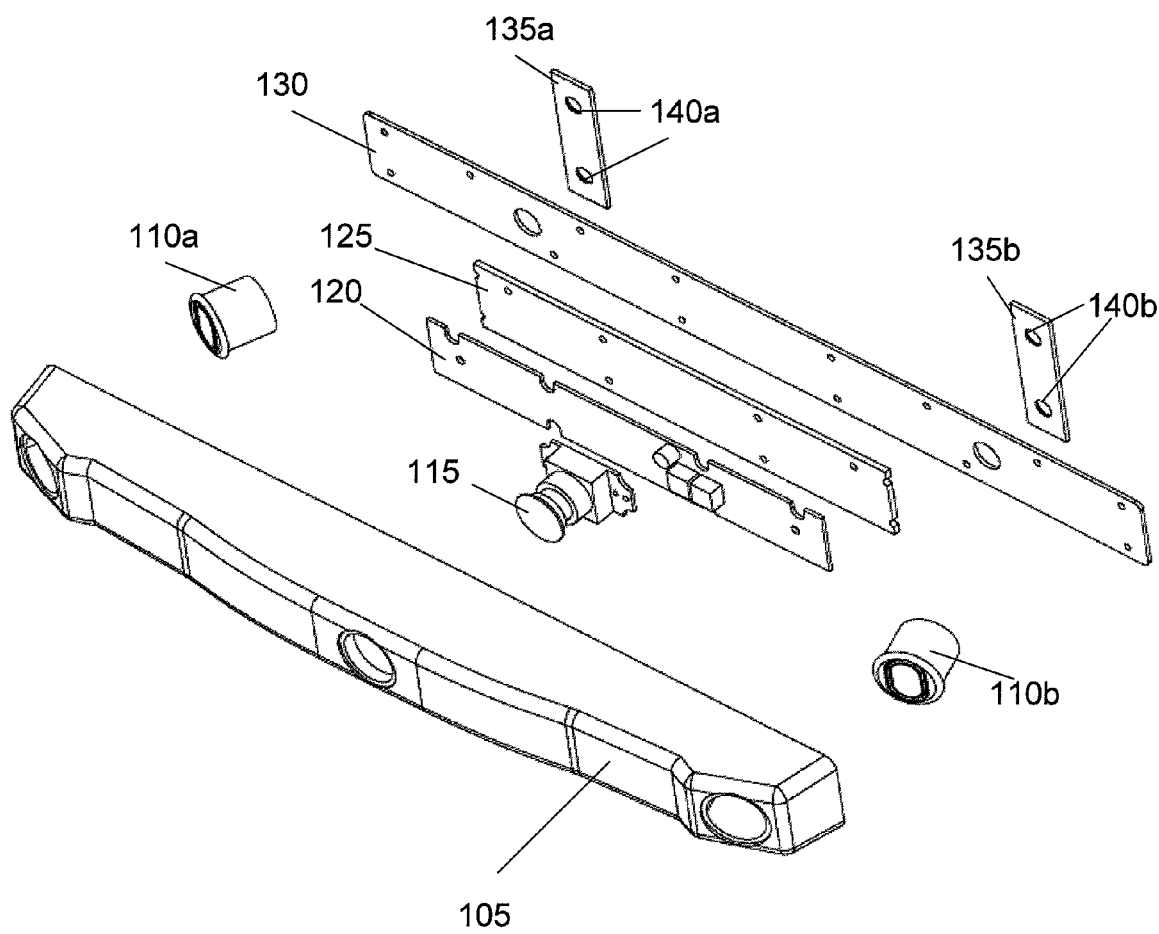
FIG. 1 is an exploded perspective view of a bar of a parking sensor and observation system add-on for a vehicle in accordance with an exemplary embodiment of the present invention.

In an exemplary embodiment of the present invention, a parking sensor and observation system for a vehicle, comprises: an elongated housing, wherein the housing has a front side with first to third openings and a back side with an elongated opening, the first and third openings are adjacent to opposite ends of the housing, the second opening is located at a center portion of the housing; a first parking sensor disposed within the housing and having its proximity detector disposed in the first opening; a second parking sensor disposed within the housing and having its proximity detector disposed in the third opening; a camera disposed within the housing and having its lens disposed in the second opening; and a backing plate disposed at the back side of the housing to seal the elongated opening.

The parking sensor and observation system further comprises mounting brackets connectable to the backing plate and for enabling the elongated housing to be mounted.

The elongated housing is mountable to a license plate, bumper or under the bumper of a vehicle.

The parking sensor and observation system further comprises a signal/power cable extended from the elongated housing and connectable to a reverse light of the vehicle.

The parking sensor and observation system is activated when the vehicle is put in reverse.

The parking sensor and observation system further comprises a monitor positionable within the vehicle, the monitor including: a display that displays images captured by the camera; and a sound source, wherein the sound source emits sound when either of the parking sensors detects an object near the back of the vehicle.

In an exemplary embodiment of the present invention, a parking sensor system for a vehicle, comprises: an elongated housing, wherein the housing has a front side with first to third openings and a back side with an elongated opening, the first and third openings are adjacent to opposite ends of the housing, the second opening is located at a center portion of the housing; a first parking sensor disposed within the housing and having its proximity detector disposed in the first opening; a second parking sensor disposed within the housing and having its proximity detector disposed in the second opening; a third parking sensor disposed within the housing and having its proximity detector disposed in the third opening; and a backing plate disposed at the back side of the housing to seal the elongated opening.

The parking sensor system further comprises mounting brackets connectable to the backing plate and for enabling the elongated housing to be mounted.

The elongated housing is mountable to a license plate, bumper or under the bumper of a vehicle.

The parking sensor system further comprises a signal/power cable extended from the elongated housing and connectable to a reverse light of the vehicle.

The parking sensor system is activated when the vehicle is put in reverse.

The parking sensor system further comprises a sound source positionable within the vehicle, wherein the sound source emits sound when either of the parking sensors detects an object near the back of the vehicle.

In an exemplary embodiment of the present invention, an aftermarket system for a vehicle, comprises a bar configured to extend from one end of a vehicle license plate to another end of the license plate and to be mounted in front of the license plate while not obstructing parts of the license plate that must be legally visible, wherein the bar includes at least one parking sensor.

The bar further includes a camera.

The bar further includes mounting brackets connectable to the bar for mounting the bar to the vehicle license plate, wherein the mounting brackets are configured so that they are not seen in front of the license plate when the bar is mounted in front of the license plate.

DETAILED DESCRIPTION OF EXEMPLARY EMBODIMENTS

In accordance with an exemplary embodiment of the present invention, there is a provided a parking sensor/observation system add-on for a vehicle. The system may include only parking sensors or a combination of parking sensors and a camera. The system includes a bar that can be easily mounted to a vehicle's license plate. However, the bar can also be mounted below a vehicle's bumper or on the bumper, depending on which mounting scheme provides the best viewing and/or sensing position, for example. The system includes mounting brackets and hardware for this purpose.

In a parking sensor and observation system add-on according to an exemplary embodiment of the present invention, there is provided a bar with two parking sensors and a backup camera, and a monitor. The monitor, which may be an LCD monitor, automatically activates to show distance and a clear view of the rear of the vehicle when the vehicle is put into reverse. The display shows digital distance indicators of obstructions. An audible display beeps faster as you get closer to an obstacle. The bar, which includes the sensors, camera and required operating circuitry, may be a chrome waterproof and dustproof housing. The bar is electronically coupled to the vehicle by a single hookup connection at the vehicle's reverse lamp.

In a parking sensor system add-on according to an exemplary embodiment of the present invention, there is provided a bar with three parking sensors, and a buzzer. The parking sensors give full range detection up to six feet behind the vehicle, for example. The system automatically activates when the vehicle is put into reverse gear. The buzzer beeps faster as you get closer to an obstacle. The external structure of the bar is essentially the same as that of the parking sensor and observation system. The bar is also electronically coupled to the vehicle by a single hookup connection at the vehicle's reverse lamp. This system additionally includes an extension cable to connect to the buzzer mounted inside the vehicle.

Both of the above-described systems are configured such that they can be installed in any vehicle by a consumer. The systems' bars can be mounted on either the front or rear bumpers/plates of a vehicle. The bar's dimensions may be exactly as wide as a standard United States license plate, and the bar can be configured such that it does not extend downward passed the plate, since this could cause it not to fit many vehicles. It is to be understood that when the bar is mounted to a vehicle's license plate, it should in most cases, not restrict parts of the plate that legal authorities wish to see. In doing this, the bar is legal in most of the United States. If, however, the bar were to restrict required viewing portions of the license plate, or if such mounting is not feasible or if a user desires a different viewing/sensing angle, the mounting brackets enable mounting below the plate, directly to the bumper or under the bumper.

Exemplary designs of these systems will now be described with reference to the figures.

FIG. 1 is an exploded perspective view of a bar of a parking sensor and observation system add-on for a vehicle in accordance with an exemplary embodiment of the present invention. As shown in FIG. 1, the bar includes a heavy-duty chrome bar housing 105 (e.g., a waterproof housing), two ultrasonic parking sensors 110a, 110b, and a CMOS camera 115. The bar also includes a printed circuit board 120 for the camera 115 and a printed circuit board 125 for the parking sensors 110a/b. The circuit boards 120/125 include microprocessors for running the camera 115 and sensors 110a/b, respectively. The bar is further provided with a backing plate 130 for sealing the unit (e.g., completing the waterproof housing). Also illustrated are flat brackets 135a,b, which can be coupled to the backing plate 130 via screw holes 140a/b for mounting.

Figure 2:
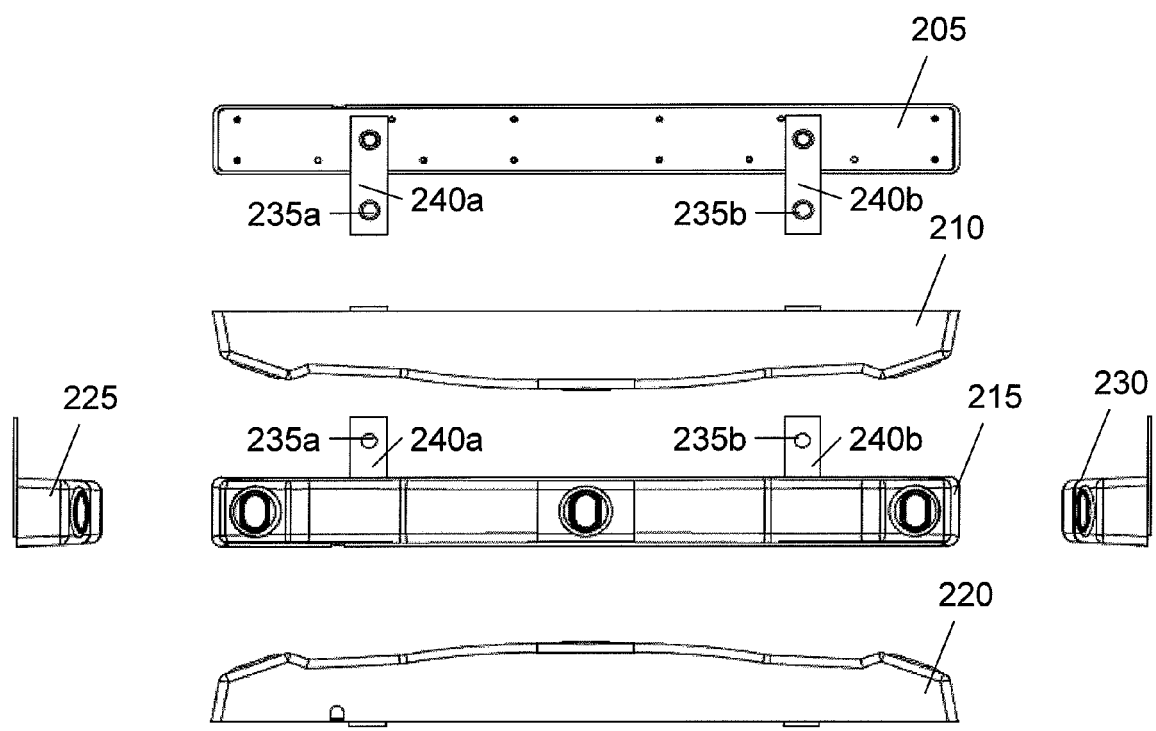
FIG. 2 is a bar of a parking sensor system add-on for a vehicle in accordance with an exemplary embodiment of the present invention, in a number of different views.

FIG. 2 is a bar of a parking sensor system add-on for a vehicle in accordance with an exemplary embodiment of the present invention, in a number of different views. Particularly, FIG. 2 shows a back-view 205 of the bar with flat brackets 240a/b having holes 235a,b attached, a top-view 210 of the bar, a front-view 215 of the bar, a bottom-view 220 of the bar and left- and right-side views 225 and 230 of the bar. It is to be understood that the views shown in FIG. 2 are essentially the same for the parking sensor and observation system add-on in FIG. 1, except that the center of the bar in the front-view 215 includes a parking sensor, not a camera.

Figure 3:
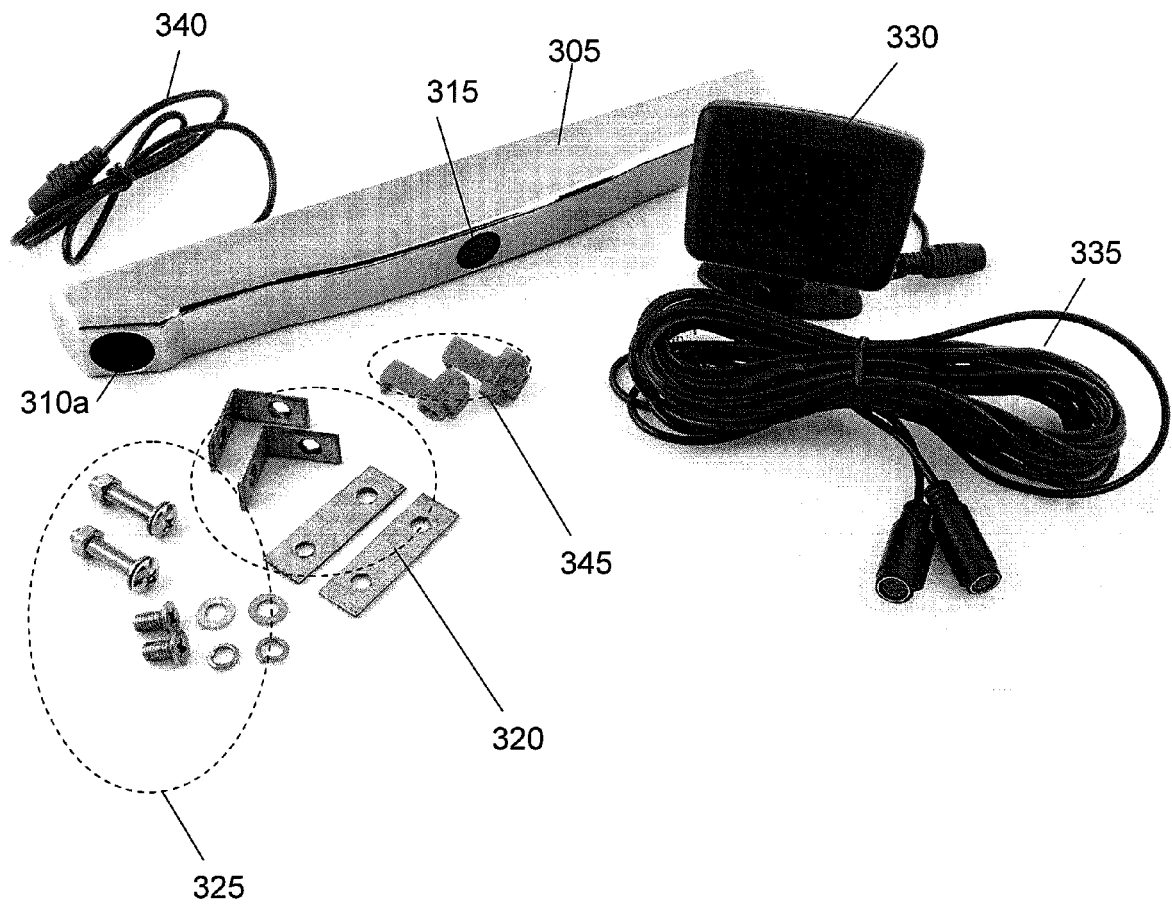
FIG. 3 shows a parking sensor and observation system add-on for a vehicle in accordance with an exemplary embodiment of the present invention.

FIG. 3 shows a parking sensor and observation system add-on for a vehicle in accordance with an exemplary embodiment of the present invention. As shown in FIG. 3, the system includes a bar 305 with two parking sensors 310a,b (one obstructed) and a camera 315. The system includes mounting brackets 320 and hardware 325 for mounting the bar 305 to a vehicle license plate or bumper, and an LCD display 330. The system also includes an extension cord 335 for connecting the display 330 to the bar 305 when the display 330 is installed inside a vehicle and the bar 305 is mounted on the vehicle's license plate. The system further includes a wire 340 for connecting the bar 305 to the vehicle's reverse lamp for power and scotch locks 345 for making the wiring connections.

Figure 4:
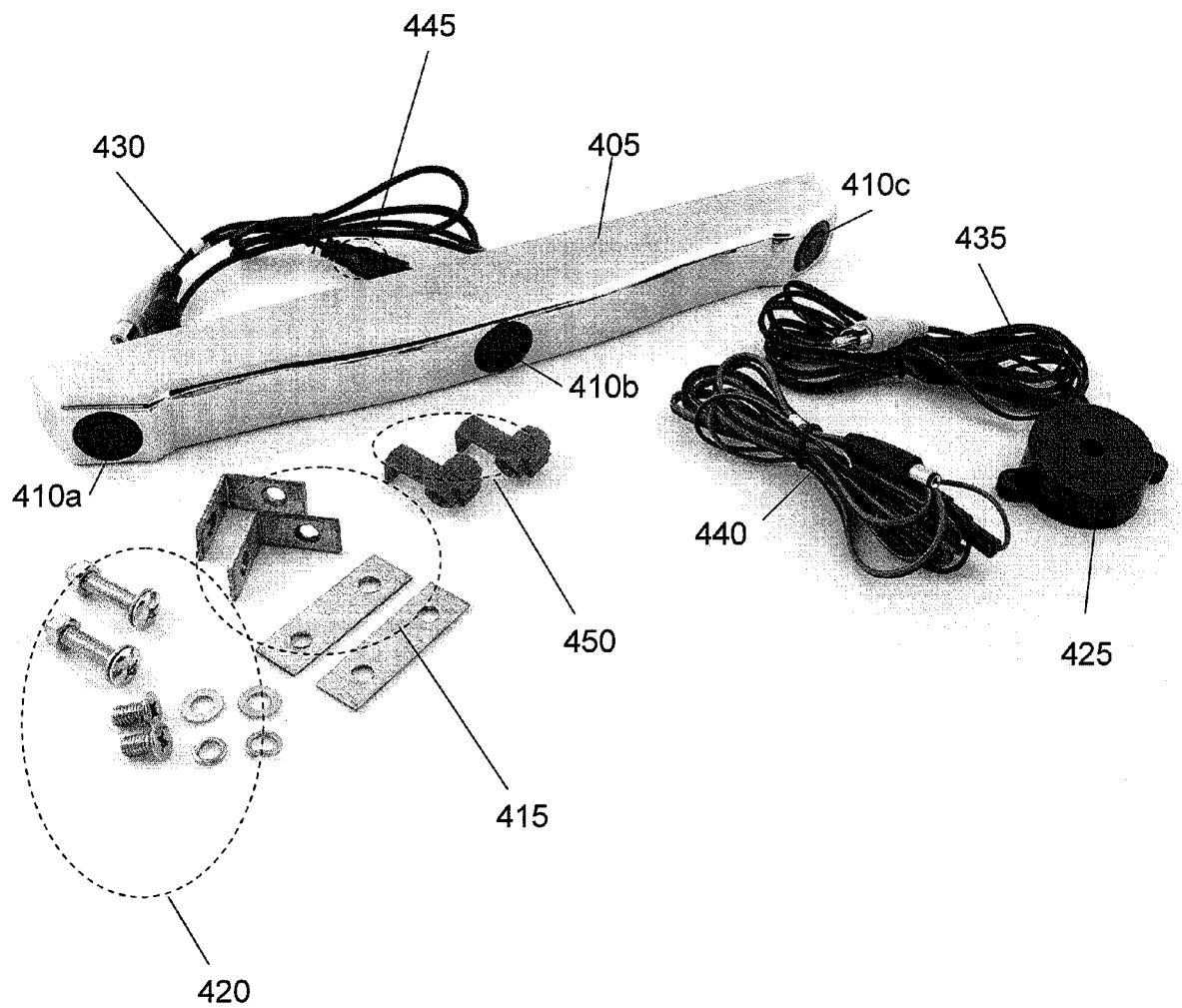
FIG. 4 shows a parking sensor system add-on for a vehicle in accordance with an exemplary embodiment of the present invention.

FIG. 4 shows a parking sensor system add-on for a vehicle in accordance with an exemplary embodiment of the present invention. As shown in FIG. 4, the system includes a bar 405 with three parking sensors 410a-c. The system includes mounting brackets 415 and hardware 420 for mounting the bar 405 to a vehicle license plate or bumper, and a buzzer 425. The system further includes wires 430 attached to the bar 405 for connecting to buzzer wires 435, wires 440 for connecting to the vehicle's reverse lamp along with a wire 445 coming from the bar 405 for power and scotch locks 450 for making the wiring connections.

Figure 5:
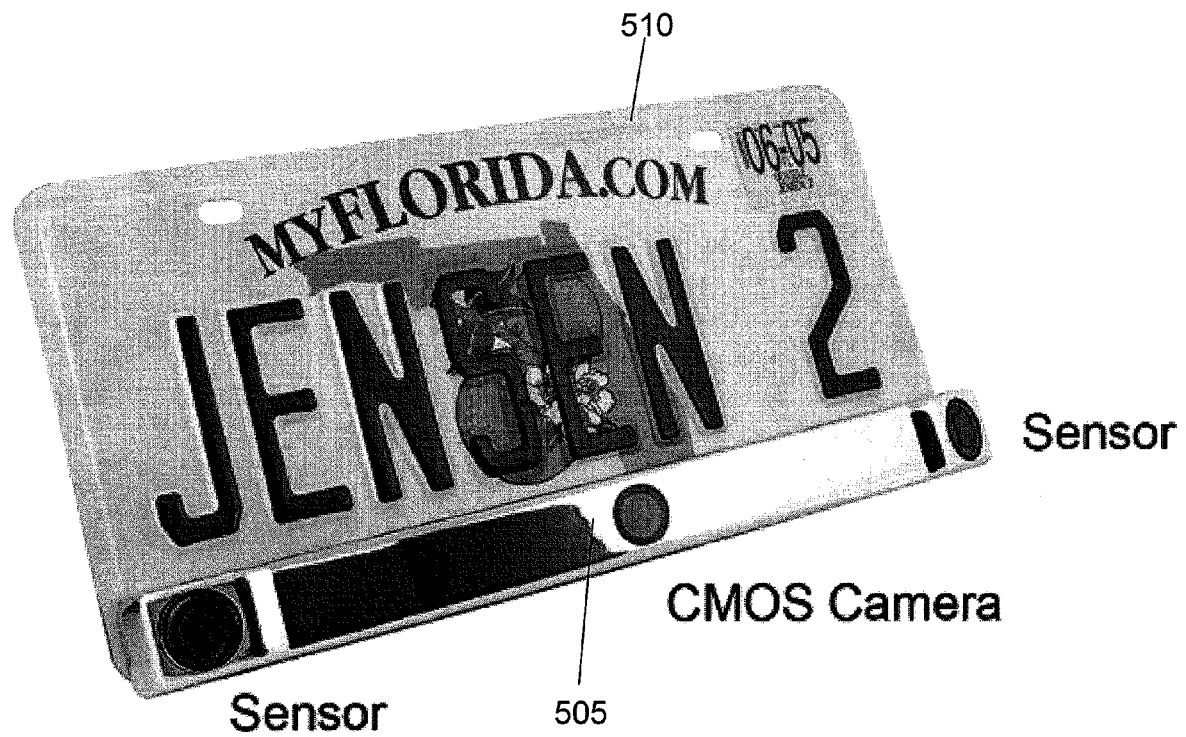
FIG. 5 shows a bar of a parking sensor and observation system add-on for a vehicle mounted to a license plate in accordance with an exemplary embodiment of the present invention.

FIG. 5 shows a bar 505 of a parking sensor and observation system add-on for a vehicle mounted to a license plate 510 in accordance with an exemplary embodiment of the present invention.

Figure 6:
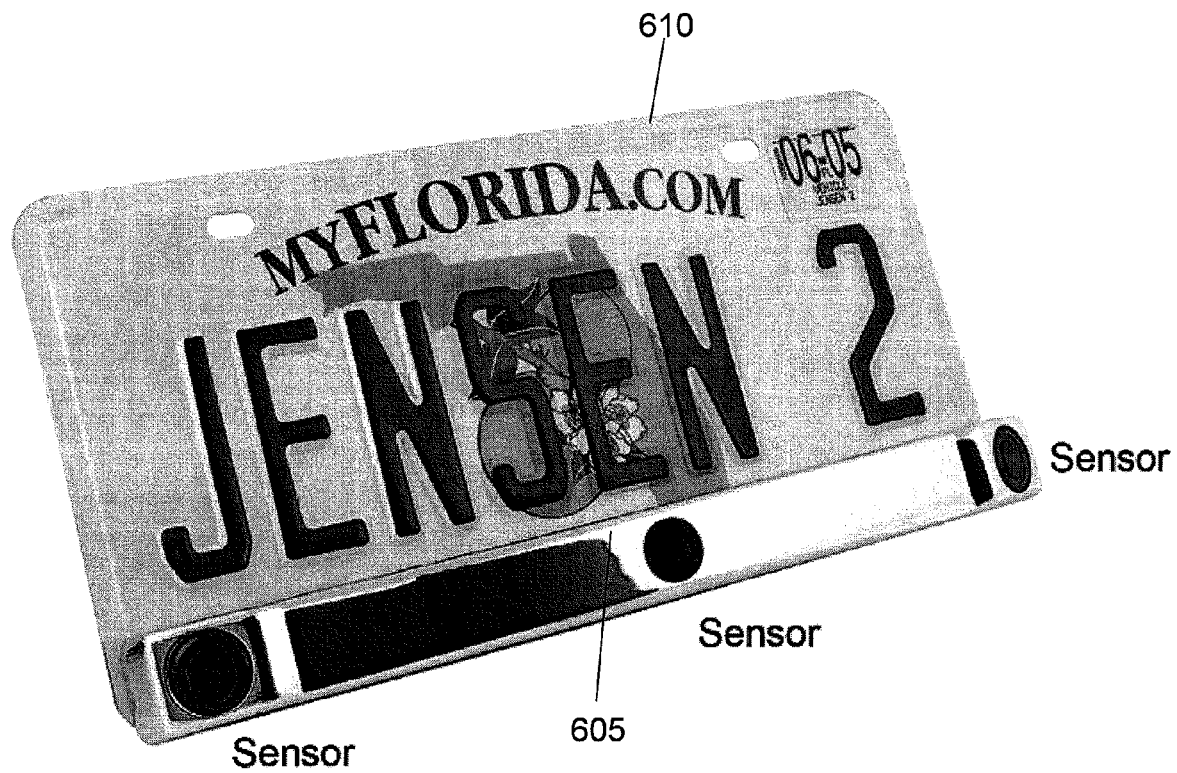
FIG. 6 shows a bar of a parking sensor system add-on for a vehicle mounted to a license plate in accordance with an exemplary embodiment of the present invention.

FIG. 6 shows a bar 605 of a parking sensor system add-on for a vehicle mounted to a license plate 610 in accordance with an exemplary embodiment of the present invention.

With reference to FIGS. 1-6, any of the exemplary bars can be mounted to the bottom or top of the license plate by placing the bar over the front of the license plate and lining up the bracket holes with corresponding license plate holes. The bar can be fastened to the license plate using the screws/bolts from behind the plate and then the license plate is fastened to the vehicle.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A vehicle observation system, comprising:
    a camera connected with a camera housing, wherein the camera housing includes a lengthwise portion and the camera is disposed within a camera mounting portion of the lengthwise portion;
    a bracket configured to connect the camera housing to a vehicle and, when connecting the camera housing to the vehicle, the camera is disposed on a first side of a license plate and the bracket is disposed on a second side of the license plate, the bracket is protruded from the camera housing and perpendicular to the lengthwise portion of the camera housing such that the bracket is securable to the vehicle from behind the license plate and, upon completion of connecting the camera housing to the vehicle, the entire bracket is disposed behind the license plate at the second side; and
    a power line configured to connect the camera to a power source via a reverse light of the vehicle, wherein when the camera is powered when the vehicle is in reverse, the camera captures an image from behind the vehicle.

2. The vehicle observation system of claim 1, wherein the camera is adjustable.

3. The vehicle observation system of claim 1, wherein the camera overlaps the license plate.

4. The vehicle observation system of claim 1, wherein the camera does not overlap the license plate.

5. The vehicle observation system of claim 1, wherein the bracket includes holes for mounting to the vehicle.

6. The vehicle observation system of claim 5, wherein the holes are configured to accommodate license plate screws.

7. The vehicle observation system of claim 1, wherein the camera protrudes away from the bracket.

8. The vehicle observation system of claim 1, further comprising: a monitor for displaying images captured by the camera.

9. The vehicle observation system of claim 1, wherein the camera is powered when the vehicle is in reverse.

10. The vehicle observation system of claim 1, wherein the bracket includes holes for connecting with the camera housing.

11. The vehicle observation system of claim 10, wherein the bracket is connected with the camera housing by using screws.

12. A vehicle observation system, comprising:
    a camera included in a camera housing, wherein the camera housing includes a lengthwise portion and the camera is disposed within a camera mounting portion of the lengthwise portion;
    a bracket configured to connect the camera housing to a vehicle and, when connecting the camera housing to the vehicle, the camera is disposed on a first side of a license plate and the bracket is disposed on a second side of the license plate, the bracket is protruded from the camera housing and perpendicular to the lengthwise portion of the camera housing such that the bracket is securable to the vehicle from behind the license plate and, upon completion of connecting the camera housing to the vehicle, the bracket is disposed behind the license plate at the second side; and
    a power line configured to connect the camera to a power source via a reverse light of the vehicle, wherein when the camera is powered when the vehicle is in reverse, the camera captures an image from behind the vehicle.

* * * * *